Sept. 2, 1969     L. M. THOMKA     3,464,546
PACKAGING OF PAINTS AND THE LIKE
Filed Dec. 14, 1967
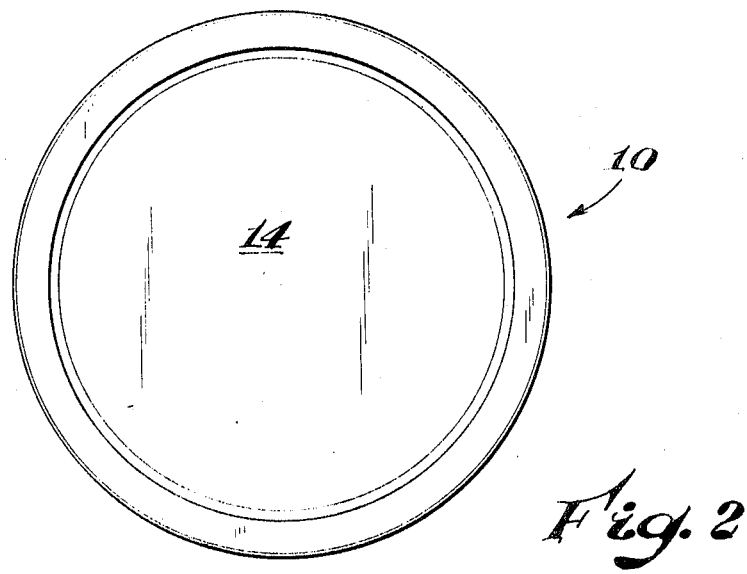
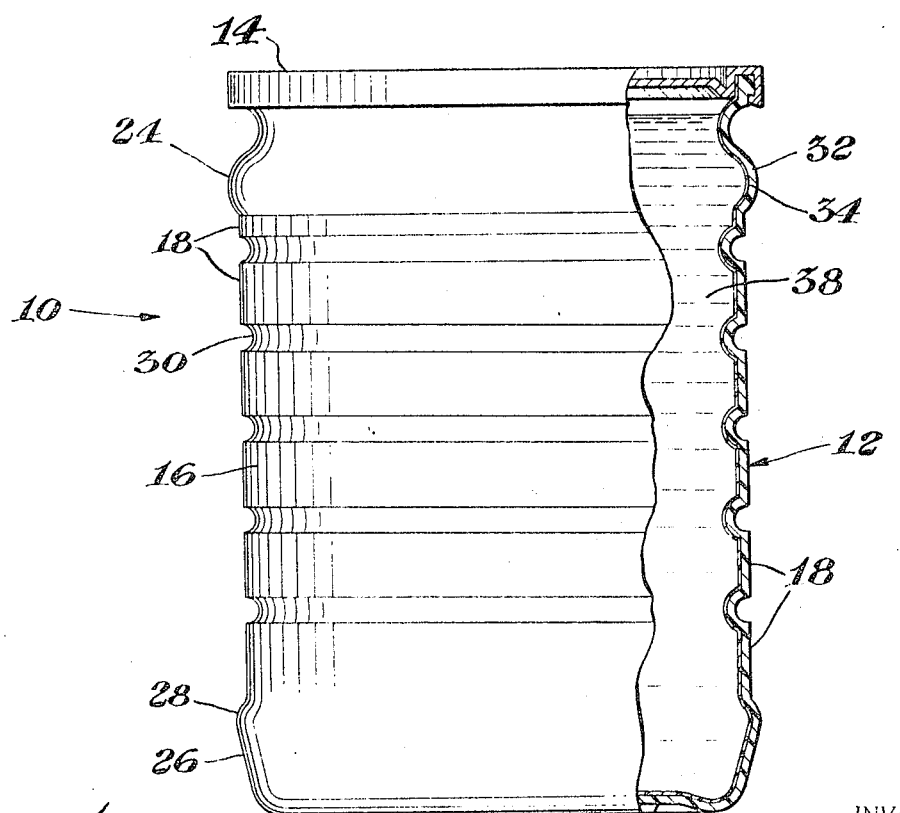
INVENTOR.
Laddie M. Thomka
BY
*Lloyd E. Hessen*
ATTORNEY

United States Patent Office 3,464,546
Patented Sept. 2, 1969

3,464,546
PACKAGING OF PAINTS AND THE LIKE
Laddie M. Thomka, Midland, Mich., assignor to The Dow Chemical Company, Midland, Mich., a corporation of Delaware
Filed Dec. 14, 1967, Ser. No. 690,542
Int. Cl. B65d 81/00, 87/00, 7/00
U.S. Cl. 206—84
8 Claims

ABSTRACT OF THE DISCLOSURE

A plastic container for latex and oil based paints and the like, the body of the container comprising multi-layers of different thermoplastic resins. The outer layer comprises a tough, high moisture barrier material such as found in a resin the major component of which is a polyolefin. The inner layer comprises a resin having high oxygen barrier characteristics such as found in resins containing saran or an unplasticised polyvinyl chloride.

DESCRIPTION

This invention relates to a substantial improvement in the packaging of materials such as latex emulsion paints or oil based paints in thermoplastic containers such as taught in U.S. Patent No. 3,184,060, for example. In the aforesaid patent a container having inner walls of high density polyethylene is suggested for the packaging of paints, particularly latex emulsion paints. However, it has been found that polyethylene alone does not provide sufficent gas barrier protection for adequate shelf life of paints containing oxygen sensitive materials. This would also be the case in linseed oil based paints. In both linseed oil based paints and latex paints containing linseed oil, oxygen can cause the drying agents therein to become active prematurely. In styrene-butadiene based latex paints, the styrene-butadiene copolymer has some residual unsaturation which can react with oxygen slowly to adversely affect the latex. Many other latex paints contain alkyd modifiers, usually esters of fatty acids, which also contain unsaturated sites that are susceptible to reacting prematurely with oxygen. Frequently, fatty acid soaps, which are likewise oxygen sensitive, are used for color dispersion in paints.

While the problem is generally not so severe since their percentage content in air is low, other gases than oxygen can also affect paints. For example, carbon dioxide can change the pH of a latex paint and oxides of nitrogen can be detrimental to certain color pigments used in paints. Thus, while a polyethylene container such as taught by the prior art has excellent moisture barrier properties, its poor gas barrier qualities have severely limited its practical use for many paints.

It is accordingly an object of the present invention to provide a thermoplastic container for paints which not only has high moisture barrier properties but also high gas barrier properties so that paints having materials which are sensitive to gases, such as oxygen, can have an extended shelf life beyond that heretofor contemplated by the prior art.

Briefly, the present invention contemplates a plastic container for latex and oil based paints and the like, the body of the container comprising multi-layers of different thermoplastic resins. The outer layer comprises a tough, high moisture barrier material such as found in a resin the chief component of which is a polyolefin. The inner layer comprises a resin having high oxygen barrier characteristics such as saran or an unplasticised polyvinyl chloride.

Yet additional objects and advantages of the present invention are even more apparent when taken in conjunction with the accompanying drawing in which like characters of reference designate corresponding material and parts throughout the several views thereof, in which:

FIGURE 1 is a side elevational view, with portions broken away, of a container for paints and the like constructed according to the priciples of the present invention; and FIGURE 2 is a top view thereof.

Container or can 10 shown specifically in the drawing is of the same general configuration as the container described in U.S. Patent No. 3,297,194, which patent is assigned to the same assignee as is the present invention. While reference can be had to U.S. Patent No. 3,297,194 for details common to the container described therein and that shown here, container 10 is generally rigid and can be briefly described here as having a cup-shaped body 12 formed entirely of thermoplastic resin and a closure or lid 14 which can be formed of metal or thermoplastic resin material such as used in the body 12. If the lid 14 were formed of thermoplastic resin it could be integrally formed with the body 12 or, if formed separately, could be attached by other conventional methods than that here shown, such as by heat sealing or solvent welding, or through use of suitable adhesives.

Body 12 has a side wall 16 defined by substantially cylindrical planar surfaces 18, and a bottom wall 20. A peripheral ring 22 and upper bumper 24 together present a generally S-curve in cross-section at the top part of side wall 14. An inclined section 26 ending at its upper extent in lower bumper 28 together form the bottom part of side wall 14. The vertical extent of the side wall 14, between upper and lower bumpers 24 and 28, is interrupted by a plurality of spaced ribs or grooves 30 extending circumferentially about the mid-section of the side wall 14. The walls of the body 12 are multi-layered, comprising specifically a relatively thick outer layer 32 and a relatively thin inner layer 34. A product 38 having a high moisture content and highly sensitive to certain gases, like oxygen, is packaged in container 10.

It has been discovered that by coating the inside of the body of a container formed of a tough resin having high moisture barrier properties (as, for example, a resin the major component of which is a polyolefin like polyethylene) with a material having significant gas barrier qualities (as, for example, saran or an unplasticised polyvinyl chloride) a container ably suited for the containing of paints which are highly sensitive to oxygen and other gaseous materials can be obtained. The gas barrier resin can be in the form of a coating which can be applied by spraying the appropriate resin in a latex or lacquor form, or which can be formed by coextrusion or laminating of the polymeric materials forming the container, such as by the techniques taught by U.S. Patent No. 2,781,551 or 3,082,484, for example. Such a container, identified by reference character 10, is shown in FIGURE 1. Thus, the outer layer 32 can be a water vapor barrier resin like polyethylene and the inner layer 34 a gas barrier resin such as saran.

As a specific example, a container 10 formed of a high density polyethylene was actually spray coated with saran resin to a thickness of approximately 0.1 mil. Because the wall thickness of a blown thermoplastic container varies somewhat from portion to portion (in this case from between approximately 15 mils to 35 mils) the thickness of the polyethylene body was taken to be 20 mils for purposes of determining the barrier properties of the coated container. The inner saran coating was of the type generally disclosed by U.S. Patent No. 2,570,478, that is, one comprising at least 80% vinylidene chloride and about 0.5% itaconic acid. The balance of the saran copolymer composition comprised acrylonitrile and methyl methacrylate compounds. Generally, such a saran coating need be no greater than about 2 mils in thickness, the relative thickness depending on the degree of gas barrier properties needed for a particular paint.

It was determined that the specific container used in the example above, that is, one having a high density polyethylene body of about 20 mils in thickness spray coated on its inside with a saran resin to a thickness of about 0.1 mil, has the following oxygen and water vapor transmission rates:

| For: | Rate |
|---|---|
| Oxygen | [1] 0.455 |
| Water vapor | [2] 0.025 |

[1] Cubic centimeters per 100 square inches at atmospheric pressure and average room temperature.
[2] Grams per 100 square inches at atmospheric pressure and 95% relative humidity.

For the same high density polyethylene resin without the saran coating the comparable rate of oxygen transmission would have been about 5 cubic centimeters. For the same saran resin composition by itself the comparable rate of water vapor transmission would have been 0.7 gram. The polyethylene layer 32 thus provides the body toughness and water barrier properties required while the thin saran coating or layer 34 gives adequate protection against gas transmission through the container wall.

Like advantages would be suspected of other high gas barrier resins which could form layer 34, such as polyvinyl chloride. This resin itself lacks toughness and is quite permeable to water. However, when combined with the advantageous features of polyethylene, it provides a highly improved container having advantages beyond those of either of the resins separately.

It is conceivable that various other container configurations, including the use of intermediate layers (such as an adhesive layer) between the outer and inner layers, would provide a container which would function well in many instances. Likewise, such a container is equally suited for keeping moisture and gases in or out of the container, the use to which it is put depending on the product contained therein. Thus, while certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A package comprising a generally rigid cup-shaped container substantially filled with a paint product which is highly sensitive to oxygen permeation through the walls of the container, said container having at least its side and bottom walls of a multi-layered resin construction comprising an inner layer coated on the inner surface of an outer layer, said outer layer of said walls comprising a resin the major component of which is a polyolefin, said inner layer of said walls comprising a resin having high oxygen barrier properties, and a closure having high oxygen barrier properties.

2. The package of claim 1 wherein said inner layer comprises a saran resin.

3. The package of claim 1 wherein said inner layer comprises an unplasticised polyvinyl chloride resin.

4. The package of claim 1 wherein said outer layer is from about 15 mils to 35 mils in thickness to provide a significant moisture barrier.

5. The package of claim 4 wherein said outer layer is about 20 mils in thickness.

6. The package of claim 5 wherein said inner layer is from about 0.1 mil to 2 mils in thickness.

7. The package of claim 6 wherein said inner layer is a saran resin about 0.1 mil in thickness.

8. The package of claim 1 wherein said closure is a metal lid sealingly crimped closed with the upper periphery of said side wall.

References Cited

UNITED STATES PATENTS

| 2,860,801 | 11/1958 | Nielsen | 220—64 |
| 3,219,729 | 11/1965 | Meyers et al. | 220—64 |

JAMES B. MARBERT, Primary Examiner